(12) United States Patent
Kim et al.

(10) Patent No.: US 8,456,809 B2
(45) Date of Patent: Jun. 4, 2013

(54) MOBILE TERMINAL

(75) Inventors: Youngjoong Kim, Seoul (KR); Seokhwan Oh, Incheon (KR); Janghyun Song, Seoul (KR); Wonseok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 12/870,677

(22) Filed: Aug. 27, 2010

(65) Prior Publication Data

US 2011/0058320 A1    Mar. 10, 2011

(30) Foreign Application Priority Data

Sep. 9, 2009 (KR) ........................ 10-2009-0085096

(51) Int. Cl.
  *H05K 5/03*  (2006.01)
(52) U.S. Cl.
  USPC ............... 361/679.01; 361/679.55; 455/575.4
(58) Field of Classification Search
  USPC ............ 361/679.01, 679.02, 679.55, 679.56, 361/679.58, 679.57; 455/575.1–575.4, 575.8, 455/90.3; 379/433.11–433.13
  See application file for complete search history.

(56) References Cited

U.S. PATENT DOCUMENTS

| | | | | |
|---|---|---|---|---|
| 5,754,906 | A * | 5/1998 | Yoshida | 396/448 |
| 7,555,321 | B2 * | 6/2009 | Yamada et al. | 455/575.1 |
| 7,600,930 | B2 * | 10/2009 | Wang et al. | 396/448 |
| 7,986,982 | B2 * | 7/2011 | Li et al. | 455/575.1 |
| 2004/0212555 | A1 | 10/2004 | Falco | |
| 2006/0079128 | A1 | 4/2006 | Chintala et al. | |
| 2010/0048268 | A1 * | 2/2010 | O'Neill et al. | 455/575.8 |

FOREIGN PATENT DOCUMENTS

EP    1367802    12/2003

OTHER PUBLICATIONS

European Patent Office Application Serial No. 10174961.2, Search Report dated Nov. 30, 2012, 6 pages.

* cited by examiner

*Primary Examiner* — Jinhee Lee
*Assistant Examiner* — Ingrid Wright
(74) *Attorney, Agent, or Firm* — Lee, Hong, Degerman, Kang & Waimey

(57) ABSTRACT

Disclosed is a mobile terminal in which while a rear case is coupled to or separated from a terminal body, a case is slopingly moved with respect to the terminal body, so a camera hole of the rear case can be freely moved without being restricted by a camera mounting part protruded from the terminal body.

14 Claims, 14 Drawing Sheets

MOBILE TERMINAL

CROSS REFERENCE TO RELATED APPLICATIONS

Pursuant to 35 U.S.C. §119(a), this application claims the benefit of earlier filing date and right of priority to Korean Patent Application No. 10-2009-0085096, filed on Sep. 9, 2009, the contents of which are hereby incorporated by reference herein in its entirety.

BACKGROUND OF THE INVENTION

1. Field of the Invention

The present invention relates to a case attachment structure for a mobile terminal.

2. Description of the Related Art

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, the multimedia player requires sufficient support in terms of hardware or software, for which numerous attempts are being made and implemented. For example, a user interface allowing users to easily and conveniently search for and select one or more functions is provided.

A case is detachably coupled to a rear surface of a mobile terminal to replace a battery or the like. In this case, however, portions of the case itself or the means used for attaching the case are exposed, which is aesthetically unpleasing and undesirable to the user.

SUMMARY OF THE INVENTION

Accordingly, one object of the present invention is to address the above-noted and other problems.

Another object of the present invention is to provide a mobile terminal with a case attachment structure providing a simple case form without exposing a fixing unit of the case when the case is fixed to a terminal body.

To achieve these and other advantages and in accordance with the purpose of the present invention, as embodied and broadly described herein, the present invention provides in one aspect a mobile terminal including: a terminal body having a camera mounting part installed to be protruded from a rear surface; and a case having a camera hole exposing the camera mounting part, detachably coupled to the rear surface of the terminal body by a locking unit, and having a configuration that a camera is protruded from the camera hole when the case is locked, wherein the locking unit includes: a plurality of locking recesses formed on the rear surface of the terminal body and having a slope guiding portion in the same direction, respectively; locking protrusions formed on an inner surface such that they correspond to the locking recesses, and having at least one slope face so as to be brought into contact with the slope guiding portion; and horizontal locking units formed on the inner surfaces of the terminal body and the case and configured to interrupt retreat of the locking protrusions in a state that the locking protrusions slopingly enter by the slope guiding portion of the locking recesses.

The locking recesses may include a plurality of first locking recesses formed along edges of the rear surface of the terminal body; and at least one locking recess formed at one portion of the camera mounting part.

The slope guiding portion of the locking recesses may include a first guide face in a sloped form with which the slope face of the locking protrusions are brought into contact when the case is locked; and a second guide face in a slope form slopingly retreating the locking protrusions when the case is unlocked.

The slope face of the locking protrusions may include a first slope face formed in a slope form to allow the first guide face to be brought into contact therewith; and a second slope face formed in a sloped form to allow the second guide face to be brought into contact therewith when the case is unlocked.

The slope face of the slope guiding portion of the locking recesses may have an angle and a length at which and with which at least one inner wall of the camera hole of the case evades the camera mounting part when the case is locked or unlocked.

The case may be formed to cover the rear surface of the terminal body and the side surface of the terminal body, and the locking protrusions may be disposed at the side portion of the case.

The case may include an interface unit installation hole in which an interface unit mounted at the terminal body is to be installed, and the length of the interface unit installation hole may be larger than the sum of the distance along which the locking protrusion is horizontally moved when the case is locked and when the case is unlocked and the length of the interface unit.

The horizontal locking unit may include: a first protrusion formed on the surface of the terminal body; and a second protrusion formed on an inner surface of the case and configured to be movable in contact with the first protrusion.

The camera mounting part may be formed to have a length corresponding to the camera hole.

A recessed portion may be formed with a certain depth at one side of the camera hole on the inner surface of the case in order to allow the case not to be caught by the camera mounting part.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Figure 1:
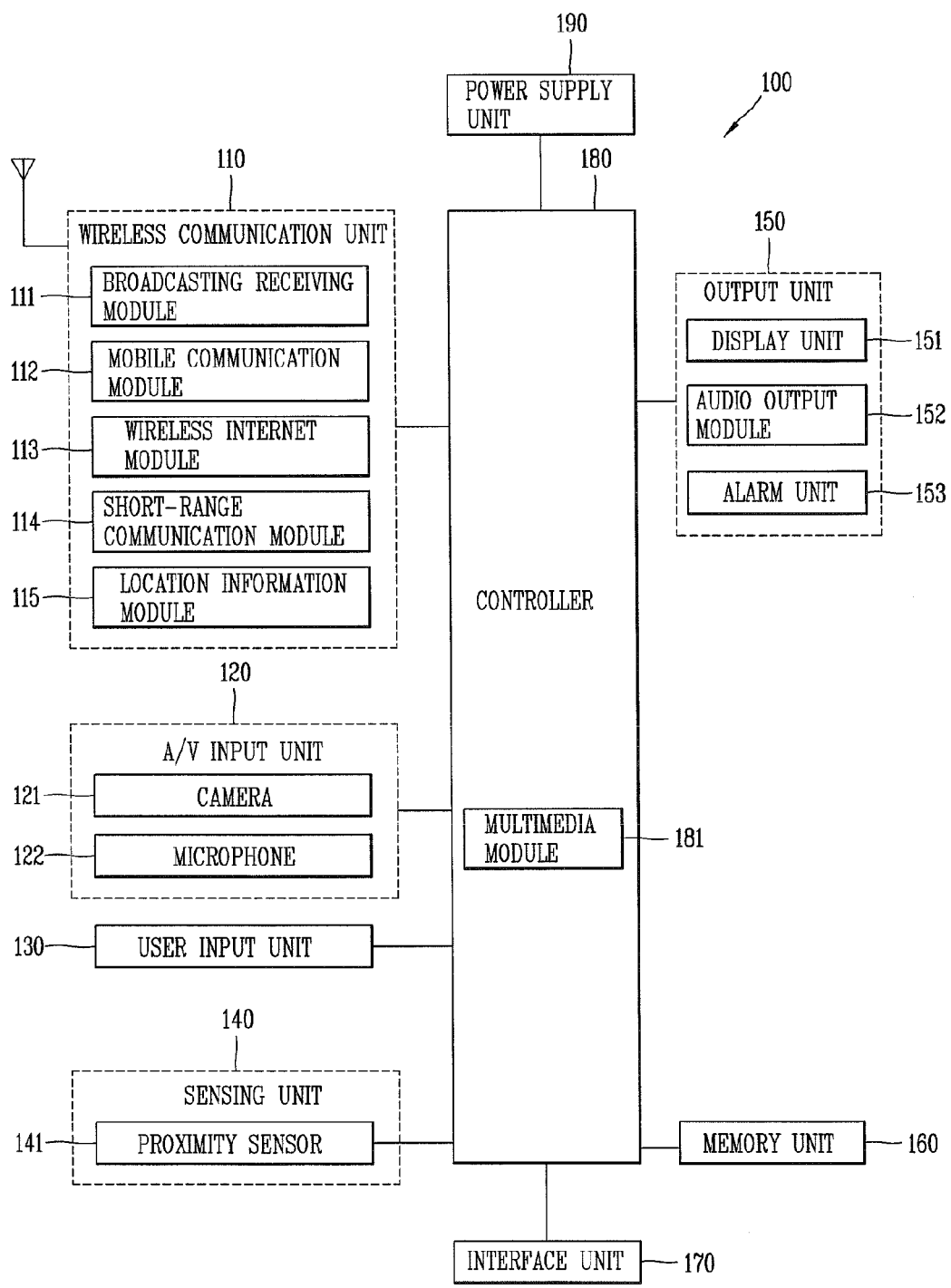
FIG. 1 is a schematic block diagram of a mobile terminal according to an exemplary embodiment of the present invention.

FIG. 1 is a block diagram of a mobile terminal according to an exemplary embodiment of the present invention.

The mobile terminal 100 may include a wireless communication unit 110, an A/V (Audio/Video) input unit 120, a user input unit 130, a sensing unit 140, an output unit 150, a memory unit 160, an interface unit 170, a controller 180, and a power supply unit 190, etc. The components as shown in FIG. 1 are not a requirement, and greater or fewer components may alternatively be implemented.

The components will be described in detail as follows.

The wireless communication unit 110 may include one or more components allowing radio communication between the mobile terminal 100 and a wireless communication system or a network in which the mobile terminal is located. For example, the wireless communication unit may include a broadcast receiving module 111, a mobile communication module 112, a wireless Internet module 113, a short-range communication module 114, and a location information module 115, etc.

The broadcast receiving module 111 receives broadcast signals and/or broadcast associated information from an external broadcast management server via a broadcast channel. The broadcast channel may include a satellite channel and a terrestrial channel. The broadcast management server may refer to a server that generates and transmits a broadcast signal and/or broadcast associated information or a server that receives a previously generated broadcast signal and/or broadcast associated information and transmits the same to a terminal. The broadcast signal may include not only a TV broadcast signal, a radio broadcast signal and a data broadcast signal, but also a broadcast signal obtained by coupling a data broadcast signal to the TV or radio broadcast signal.

The broadcast associated information may be information related to a broadcast channel, a broadcast program or a broadcast service provider.

The broadcast associated information may be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), etc.

The broadcast receiving module 111 may receive digital broadcast signals by using digital broadcast systems such as multimedia broadcasting-terrestrial (DMB-T), digital multimedia broadcasting-satellite (DMB-S), media forward link only (MediaFLO®), digital video broadcast-handheld (DVB-H), integrated services digital broadcast-terrestrial (ISDB-T), etc. The broadcast receiving module 111 may be configured to be suitable for any other broadcast systems as well as the above-described digital broadcast systems.

Broadcast signals and/or broadcast-associated information received via the broadcast receiving module 111 may be stored in the memory unit 160.

The mobile communication module 112 transmits and receives radio signals to and from at least one of a base station, an external terminal and a server. Such radio signals may include a voice call signal, a video call signal or various types of data according to text/multimedia message transmission and reception.

The wireless Internet module 113 refers to a module for a wireless Internet access. This module may be internally or externally coupled to the terminal. The wireless Internet technique may include a WLAN (Wireless LAN) (Wi-Fi), Wibro (Wireless broadband), Wimax (World Interoperability for Microwave Access), HSDPA (High Speed Downlink Packet Access), etc.

The short-range communication module 114 refers to a module for short-range communication. As the short range communication technologies, Bluetooth™, radio frequency identification (RFID), infrared data association (IrDA), ultra-wideband (UWB), ZigBee™, etc., may be used.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory unit 160 or transmitted via the wireless communication unit 110. Two or more cameras 121 may be provided according to the configuration of the mobile terminal.

The microphone 122 may receive sounds (audible data) via a microphone or the like in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. Meanwhile, the sensing unit 140 may include a proximity sensor 141. The proximity sensor 141 will be described in relation to a touch screen later.

The interface unit 170 serves as an interface by which at least one external device may be connected with the mobile terminal 100. For example, the external devices may include wired or wireless headset ports, an external power supply ports, wired or wireless data ports, memory card ports, ports for connecting a device having an identification module, audio input/output (I/O) ports, video I/O ports, earphone ports, or the like.

The identification module may be a chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may be operated as a signal for recognizing that the mobile terminal is accurately mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

The proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Without the proximity sensor 141, if the touch screen is an electrostatic type, the approach of a pointer (stylus) can be detected based on a change in a field according to the approach of the pointer.

The audio output module 152 may convert and output as sound audio data received from the wireless communication unit 110 or stored in the memory unit 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory unit 160 may store software programs or the like used for the processing and controlling operations performed by the controller 180, or may temporarily store data (e.g., a phonebook, messages, still images, video, etc.) that have been outputted or which are to be outputted. In addition, the memory unit 160 may store data regarding various patterns of vibrations and sounds outputted when a touch is applied onto the touch screen.

The memory unit 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory unit 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Figure 2:
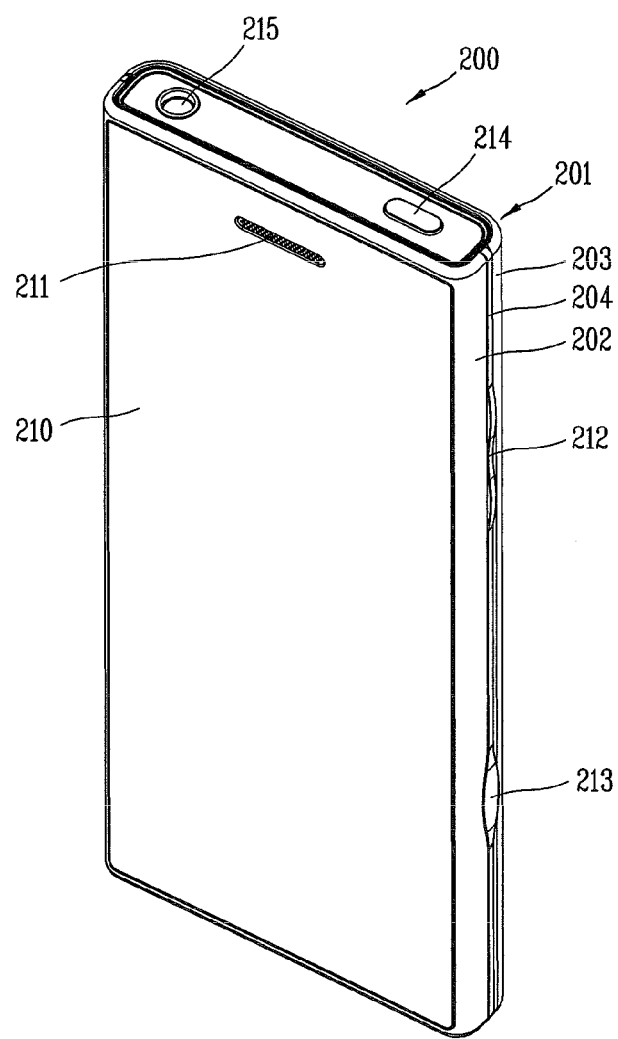
FIG. 2 is a front perspective view of the mobile terminal according to an exemplary embodiment of the present invention.
Figure 3:
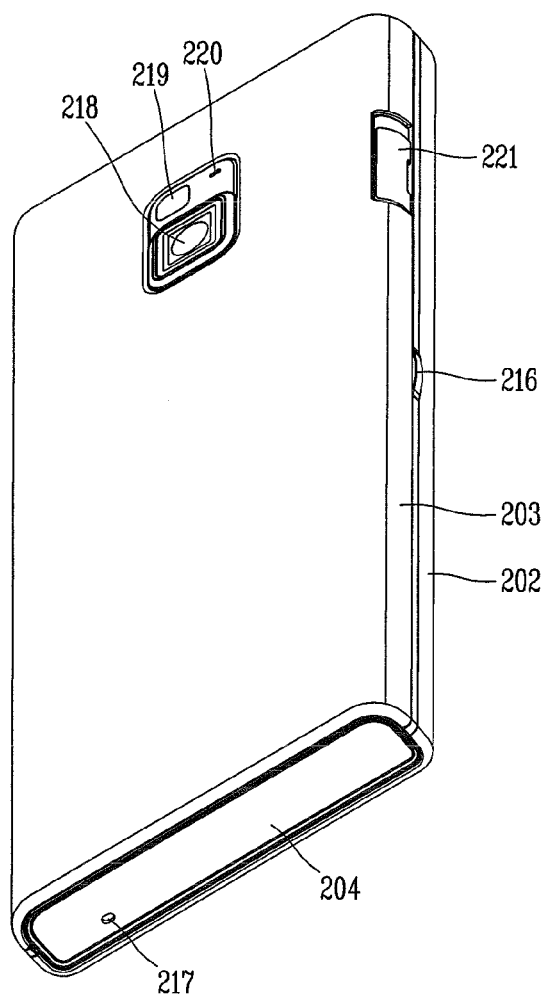
FIG. 3 is a rear perspective view of the mobile terminal according to an exemplary embodiment of the present invention.

FIG. 2 is a front perspective view of the mobile terminal according to an exemplary embodiment of the present invention, and FIG. 3 is a rear perspective view of the mobile terminal according to an exemplary embodiment of the present invention.

The mobile terminal as illustrated has a bar-shaped terminal body 201. However, without being limited thereto, the mobile terminal can be applicable to various structures such as a slide type mobile terminal, a folder type mobile terminal, a swing type mobile terminal, a swivel type mobile terminal, and the like, having two or more bodies which are coupled to be relatively movable.

The case (or casing, housing, cover, etc.) constituting the external appearance of the terminal body 201 includes a front case 202 and a rear case 203. Various electronic components are installed in the space between the front case 202 and the rear case 204. At least one intermediate case 203 may be additionally disposed between the front case 202 and the rear case 203. With reference to FIG. 2, the portions of the intermediate case 203 exposed from the side surface of the terminal body has a single narrow, long stripe form, while the portions of the intermediate case 203 exposed from upper and lower ends are more recessed than the edge portions of the front case 202 and the rear case 203.

The cases may be formed by injection-molding a synthetic resin or may be made of a metallic material such as stainless steel (STS) or titanium (Ti), etc. Like A display unit 210 and an audio output unit 211 may be disposed on the front surface of the terminal body 201.

The display unit 210 may be implemented as a liquid crystal display (LCD) module for visually displaying information, an organic light emitting diode (OLED) module, an e-paper, and the like. The display unit 210 may include a touch sensing unit allowing for an inputting operation in a tactile manner. Thus, when a point on the display unit 210 is touched, content corresponding to the touched position is inputted. The content inputted in the tactile manner may be characters, numbers, menu items that can be indicated or designated in various modes, and the like. The touch sensing unit may be light-transmissive to allow the display unit 210 to be seen, and may have a structure for enhancing visibility of the touch screen in a bright area.

The audio output unit 211 may be implemented in the form of a receiver that transfers a speaker sound to the user's ear, or in the form of a loud speaker for outputting various alarm sounds or a multimedia reproduction sound of the mobile terminal 200.

Side keys 212, 213, and 216 may be generally called a manipulation unit, and configured to receive a command for controlling the operation of the mobile terminal 200. Content inputted by the side keys 212, 213, and 216 may be variably set. For example, a command for controlling the image input unit 218, a command for adjusting of the size of the sound outputted from the audio output unit 211, or a command for changing the display unit 210 to a touch recognition mode, and the like, may be received. With reference to FIGS. 2 and 3, the side keys include a first side key 212 for adjusting a volume or the like, a second side key 213 for manipulating a camera, and a third side key 216 for performing other functions.

The audio input unit 217 may be implemented in the form of a microphone in order to receive the user voice, other sounds, and the like.

The interface unit 170 may be disposed at the side of the terminal body 201. The interface unit 170 is used as a communication link (or passage, path, etc.) through which the mobile terminal can exchange data or the like with an external device. For example, the interface unit 170 may be implemented in the form of a connection port for connecting an earphone to the mobile terminal via a wireline or wireless means, a port for short-range communications (e.g., an Infrared Data Association (IrDA) port, a Bluetooth™ port, a wireless LAN port, etc.), power supply ports for providing power to the mobile terminal, or the like. Also, the interface unit 170 may be a card socket for accommodating a SIM (Subscriber Identification Module) card or a UIM (User Identity Module) card, or an external card such as a memory card for storing information.

With reference to FIG. 2, on the upper end face of the terminal body, there are formed a jack 215 for connecting an ear set and an infrared port 214 for infrared communication, as sort of an interface unit 221.

An image input unit may be disposed on the front surface or on the rear surface of the terminal body. FIG. 3 shows the case where the image input unit 218 is disposed on the rear surface of the terminal body. An image input unit disposed on the front surface of the terminal body may be used for capturing the user face when the user performs video call communication.

A flash 220 and a mirror 219 may be additionally disposed adjacent to the image input unit 218. When an image of the subject is captured, the flash 220 illuminates the subject. The mirror 219 allows the user to see himself when he wants to capture his own image (i.e., self-image capturing) by using the image input unit 218.

Figure 4:
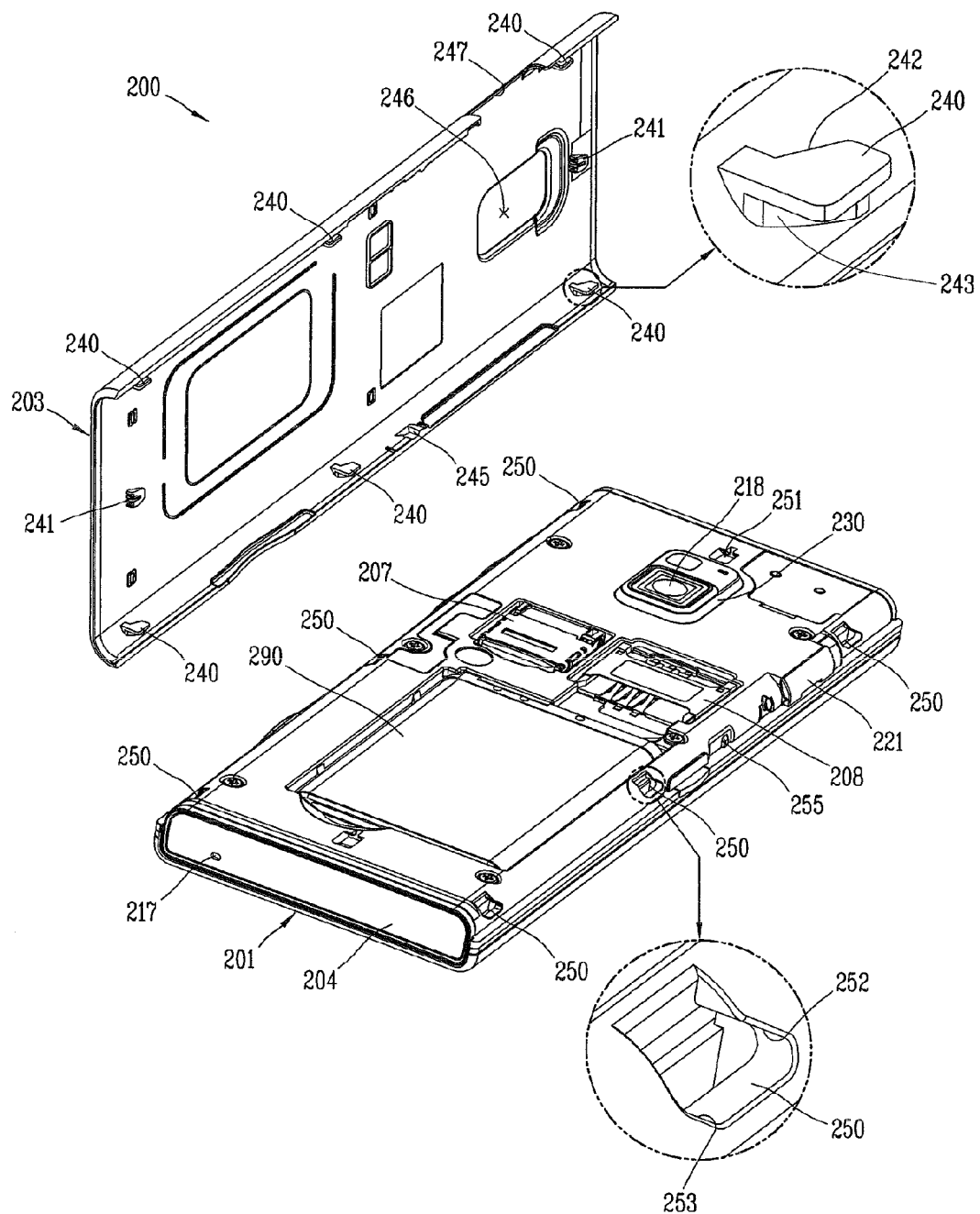
FIG. 4 is a separated perspective view of a case locking structure of the mobile terminal, showing a rear case separated from a terminal body according to an exemplary embodiment of the present invention.

A power supply unit is mounted on the rear surface of the terminal body 201 in order to supply power to the mobile terminal 200. The power supply unit may be configured to be installed in the terminal body 201 or may be directly detachably attached to the terminal body 201. With reference to FIG. 4, the power supply unit 290 is installed on an inner surface of the rear case 203.

Figure 5:
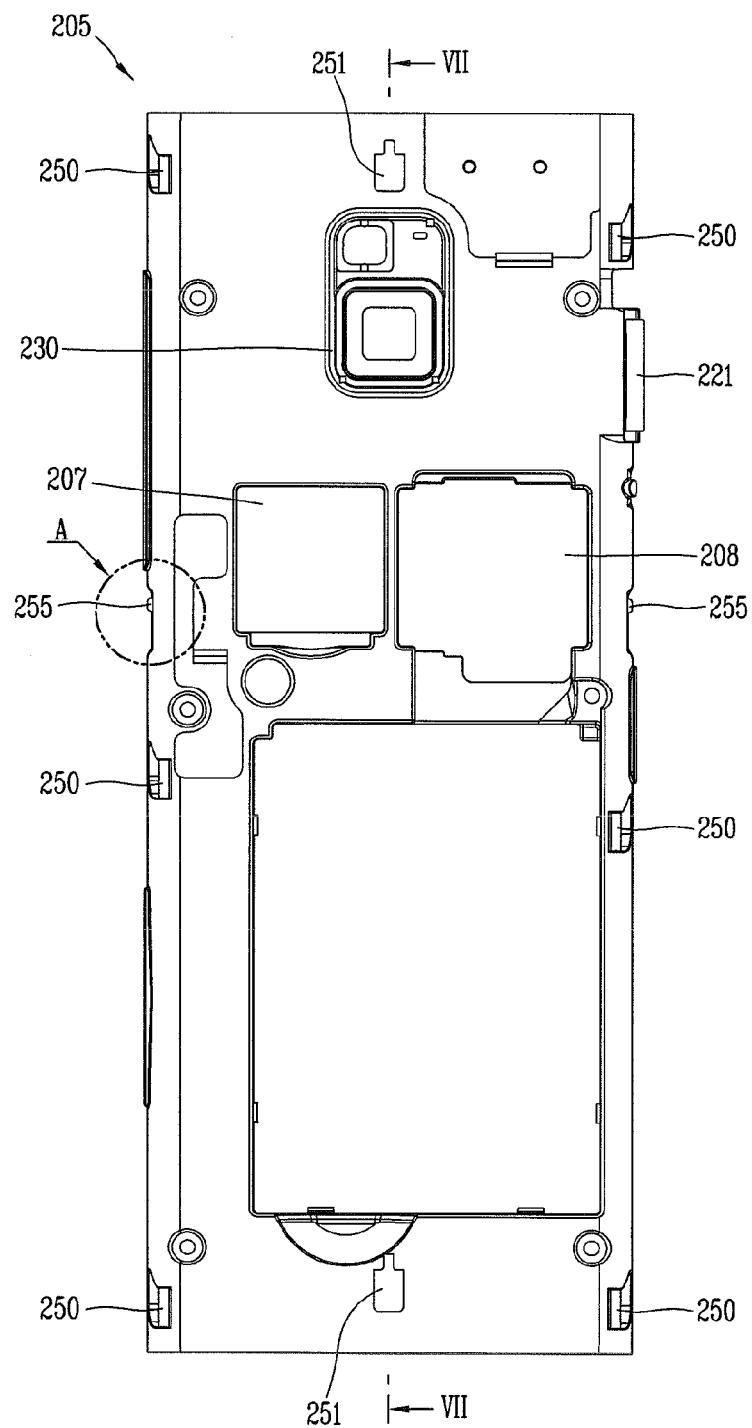
FIG. 5 is a plan view of an inner case constituting the terminal body.
Figure 6:
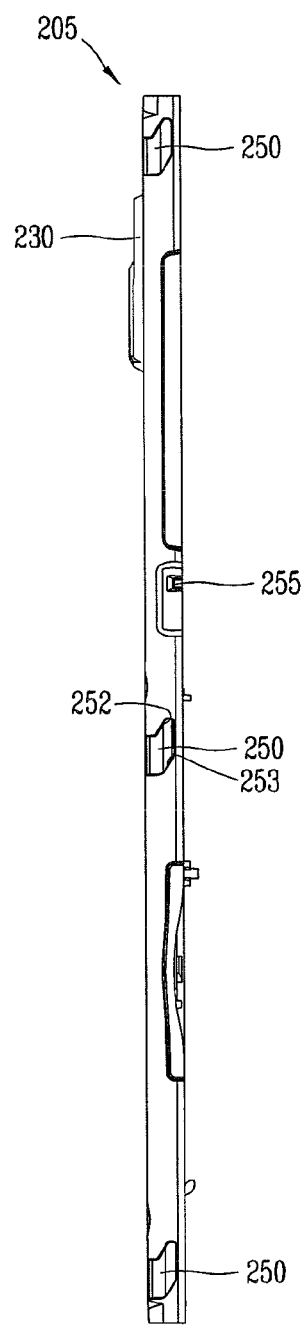
FIG. 6 is a side view of the inner case of FIG. 5.
Figure 7:
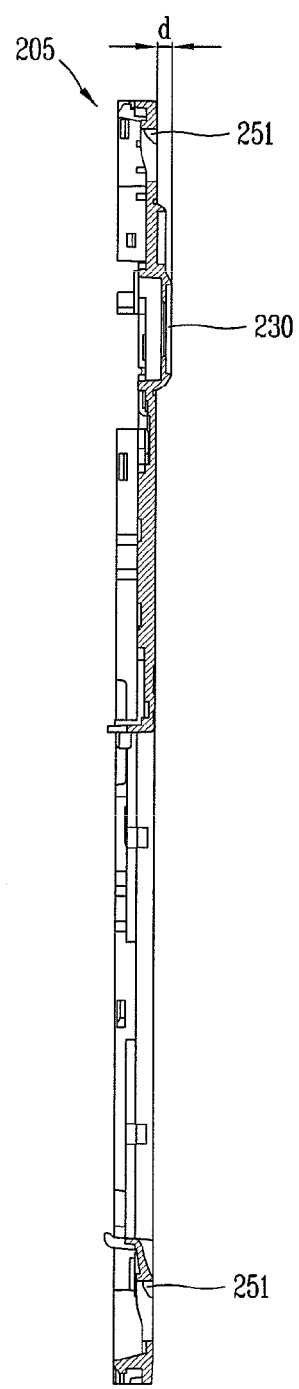
FIG. 7 is a sectional view taken along line VII-VII of FIG. 5.
Figure 8:
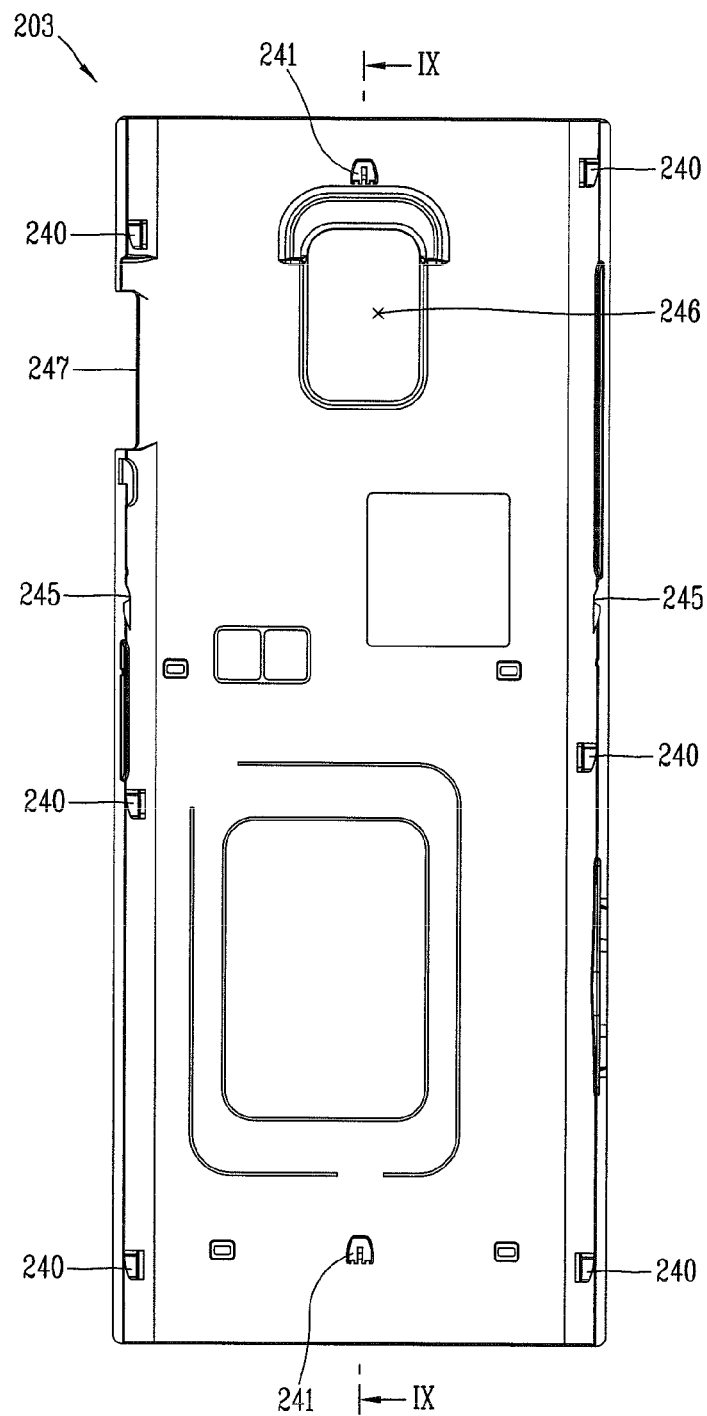
FIG. 8 is an internal plan view of a rear case according to an exemplary embodiment of the present invention.
Figure 9:
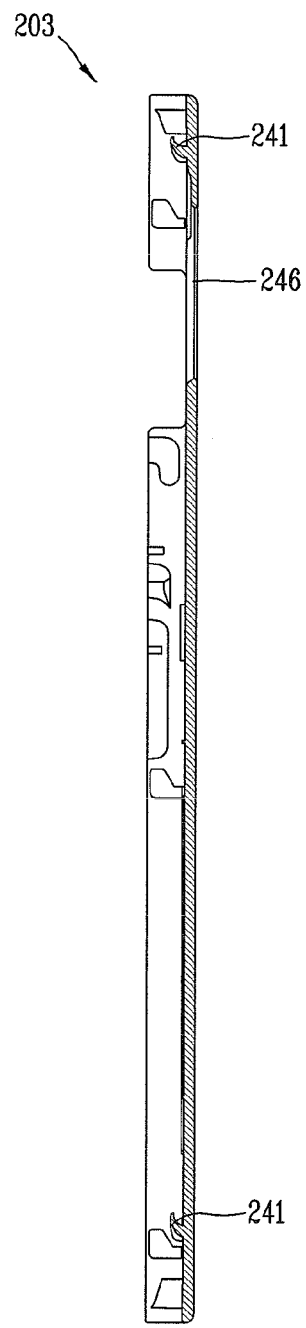
FIG. 9 is a sectional view taken along line IX-IX of FIG. 8.
Figure 10:
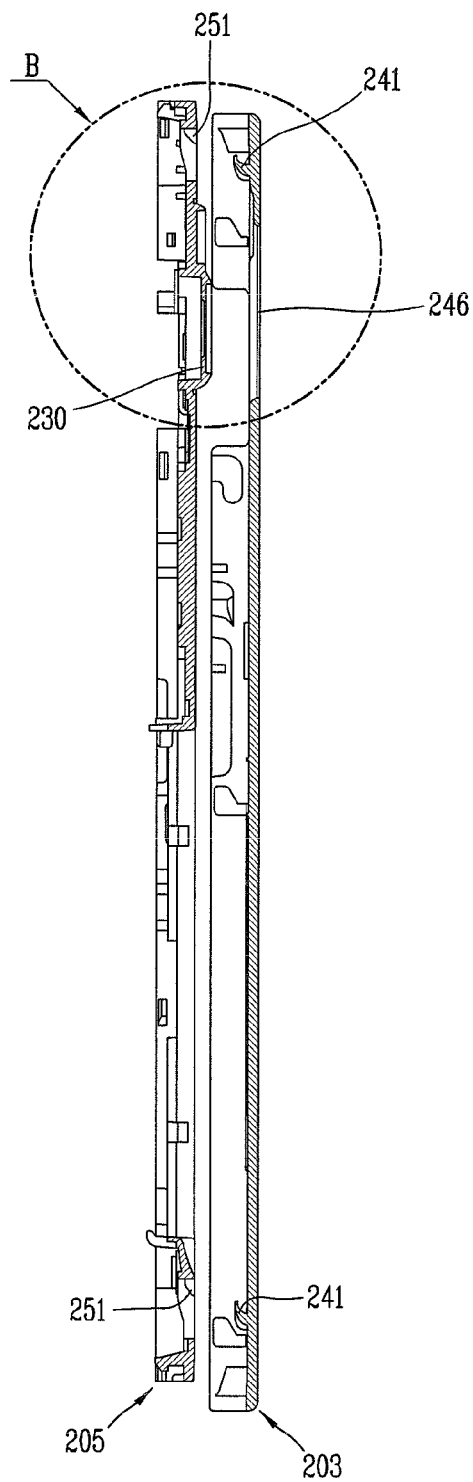
FIG. 10 is a sectional view showing a configuration before the rear case is coupled to the inner case.

FIG. 4 is a separated perspective view of a case locking structure of the mobile terminal, showing a rear case separated from a terminal body according to an exemplary embodiment of the present invention, FIG. 5 is a plan view of an inner case constituting the terminal body, FIG. 6 is a side view of the inner case of FIG. 5, FIG. 7 is a sectional view taken along line VII-VII of FIG. 5, FIG. 8 is an internal plan view of a rear case according to an exemplary embodiment of the present invention, and FIG. 9 is a sectional view taken along line IX-IX of FIG. 8.

As shown in FIG. 4, the rear case 203 may be formed so large as to cover the rear surface or the side surface of the terminal body 201. A battery 290, a memory socket 207, a user identification card (SIM) socket 208, and the like, are installed on the rear surface of the terminal body 201 which is exposed by separating the rear case 203. These components can be replaced by detaching only the rear case 203, so the external appearance can be significantly improved compared with the case where an opening and closing cover unit is provided for each component.

The terminal body 201 includes a camera 218 to capture an image of a subject at a rear side. The camera 218 is installed within the camera mounting part 230, and the camera mounting part 230 is protruded from the rear surface of the terminal body 201 (See FIG. 7). The camera 218 tends to increase in size as it increasingly has a higher resolution, so the protruded camera mounting part 230 can be easily applicable for the case where the camera 218 has a high resolution.

A camera hole 246 is formed on the rear case 203 to expose the camera mounting part 230, and an interface installation hole 247 is formed at one side of the rear case 203 in order to install an interface unit 221. The camera hole 246 and the interface installation hole 247 have a structure allowing for a free attachment to or detachment from the terminal body 201 of the rear case 203 without causing any trouble.

In order to attach or detach the rear case 203, the mobile terminal 200 includes a locking unit for maintaining the rear case 203 in a state of being mounted on the terminal body 201 (locked state) or releasing the locked state. The locking unit may be implemented by a plurality of elements formed at the rear case 203 and the terminal body 201.

The locking unit may include locking recesses 250 and 251, locking protrusions 240 and 241, and horizontal locking units 245 and 255.

The locking recesses 250 and 251 are formed on the rear surface of the terminal body 201, and the locking protrusions 240 and 241 are formed on the inner surface of the rear case 203. With reference to FIGS. 4 and 5, the locking recesses 250 and 251 include first locking recesses 250 disposed along the edges of the rear surface of the terminal body 201 and second locking recesses disposed at one side of the camera mounting part 230 and at one side of the battery. The locking recesses 250 and 251 may have slope guiding portions in the same direction so that the case can be locked or unlocked slopingly while the locking protrusions 240 and 241 are received.

As shown in FIGS. 4 and 6, the slope guiding portion includes a first guide face 252 with which the locking protrusions 240 and 241 are brought into contact when the case is locked, and a second guide face 253 in a slope form to slopingly retreat the locking protrusions 240 and 241 when the case is unlocked. By the combination of the first guide face 252 and the second guide face 253, the locking protrusions 240 and 241 may slopingly enter the locking recesses 250 and 251 so as to be in a locked state or may be slopingly retreated so as to be unlocked. The angle and length of the slope face of the slope guide portion may be determined at which or with which at least one inner wall of the camera hole 246 of the rear case 203 evades the camera mounting part 230 when the rear case 203 is locked or unlocked.

With reference to FIG. 4, the locking protrusions 240 and 241 include the first locking protrusion 240 formed at a position corresponding to the first locking recess 250 and the second locking protrusion 241 formed at a position corresponding to the second locking recess 251. The first locking protrusion 240 includes a first slope face 242 and a second slope face 243 corresponding to the first guide face 252 and the second guide face 253 of the first locking recesses 250. Namely, the first slope face 242 is formed to have a slope form to allow the first guide face 252 to be brought into contact therewith when the rear case 203 is locked, and the second slope face 243 is formed to have a slope form to allow the second guide face 253 to be brought into contact therewith when the rear case 203 is unlocked. The combinations of the first slope face 242 and the first guide face 252 and the second slope face 243 and the second guide face 253 guarantee the sloping movement when the rear case 203 is moved toward the inner case 204 so as to be locked or when the rear case 203 is released from the inner case 205 so as to be separated. In addition, the sloping movement allows the camera mounting part 230 protruded from the camera hole 246 to move to a locking position or unlocking position without any restriction over the camera hole 246.

Figure 11A:
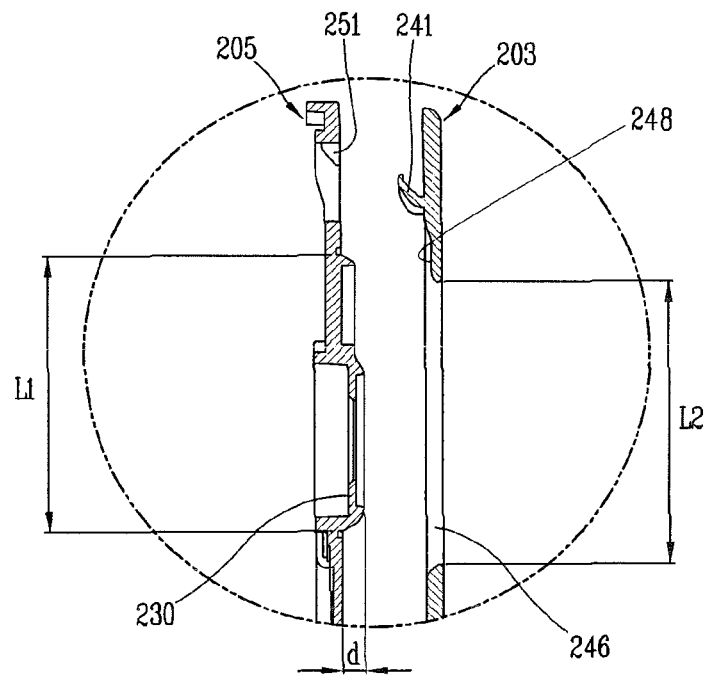
FIGS. 11A to 11C show operational states for explaining the process of coupling the rear case to the inner case.

FIGS. 10 and 11A to 11C illustrate such operations of the rear case. Namely, as shown in FIG. 11A, in order to couple the rear case 203 to the inner case 205 in a state that the camera mounting part 230 is protruded by a certain height (d) from the rear surface of the inner case 205, the rear case 203 is positioned to be slightly lower than the inner case 205. The length L1 of the camera mounting part 230 corresponds to the length L2 of the camera hole 246 formed on the rear case 203 (namely, the length L1 and the length L2 are substantially equal), so in this case, the camera mounting part 230 and the camera hole 246 are not at corresponding positions.

Figure 11B:
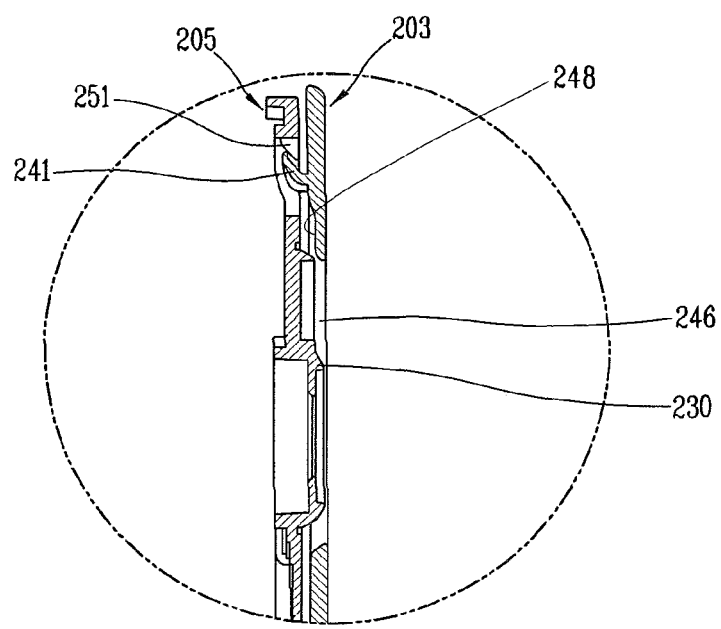

As shown in FIG. 11B, as the second locking protrusion 241 enters the second locking recess 251 to start to move slopingly, the camera mounting part 230 gradually fits the position of the camera hole 246. Of course, the combination of the first locking protrusion 240 and the second locking recess 251 involves the sloping movement of the rear case 203. Conversely, in order to prevent the edge portions of the camera mounting part 230 from coming in contact with the inner wall of the camera hole 246 when the camera hole 246 is slopingly moved, the edge portions of the camera mounting part 230 or the camera hole 246 may be formed to be chamfered or rounded.

In addition, preferably, a recessed portion 248 is formed with a certain depth at one side of the camera hole 246 at the inner surface of the rear case 203 in order to allow the rear case 203 not to be caught by the camera mounting part 230 while moving.

Figure 11C:
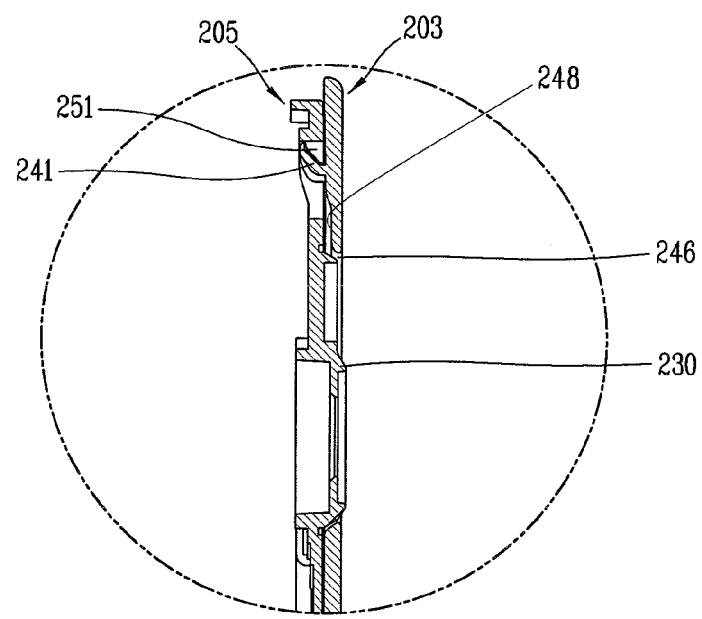

When the second locking protrusion 241 completely enters the second locking recess 251, the camera mounting part 230 is protruded from the camera hole 246 so as to be exposed as shown in FIG. 11C.

Even when the rear case 203 slopingly moves so the locking protrusions 240 and 241 are locked in the locking recesses 250 and 251, it may be difficult for the locking protrusions 240 and 241 to maintain a completely locked state with respect to the locking recesses 250 and 251. Thus, a structure (horizontal locking unit) for preventing retreating, namely, a horizontal movement of the rear case 203, is provided between the rear case 203 and the terminal body 201.

In more detail, as shown in FIG. 4, the horizontal locking unit includes a first protrusion 255 formed on the surface of the terminal body 201 and a second protrusion 245 formed on an inner surface of the rear case 203. The first protrusion 255 is positioned in the middle of the longer side of the rear case 203 that is likely to be relatively easily deformed.

Figure 12A:
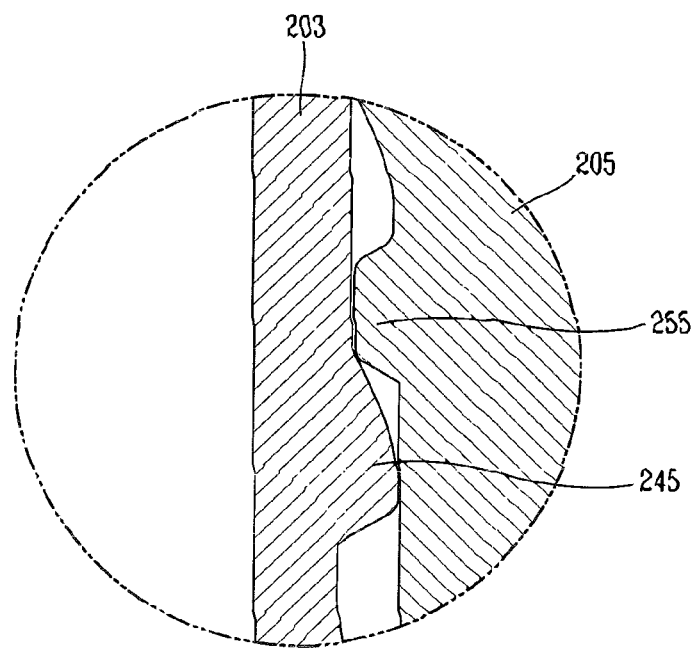
FIGS. 12A to 12C are sectional views showing the structure of horizontal locking units and operational states according to an exemplary embodiment of the present invention.

The operation of the first protrusion 255 and the second protrusion 245 will now be described with reference to FIGS. 12A to 12C. FIG. 12A shows a state immediately before the rear case 203 is slopingly moved so as to be coupled to the inner case 205.

Figure 12B:
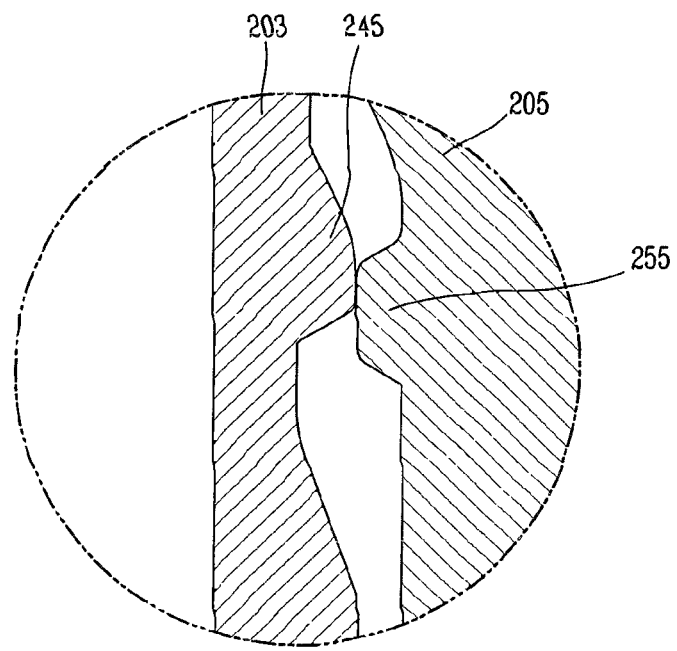

In this state, when the rear case 203 is slopingly moved with respect to the inner case 205, the first protrusion 255 and the second protrusion 245 are relatively moved according to the horizontal movement component to widen the side of the rear case 203 (FIG. 12B).

Figure 12C:
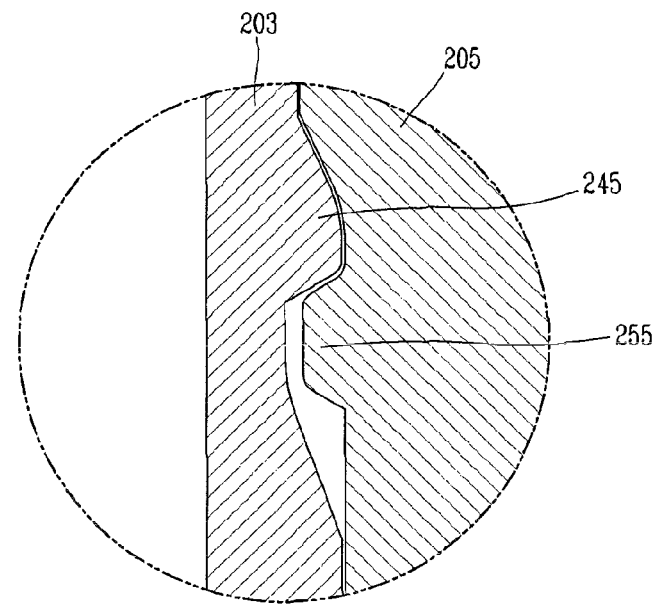

Instantly when the first protrusion 255 and the second protrusion 245 pass through the peak, the rear case 203 is elastically moved in a direction in which it has been moved due to the elastic restorative operation of the rear case 203 and the configuration of the first protrusion 255 and the second protrusion 245 (FIG. 12C). Then, the rear case 203 is coupled to the inner case 205. In this state, unless a reversing force of more than a certain value is applied, there is no relative horizontal movement between the first protrusion 255 and the second protrusion 245 by virtue of the configuration of the first protrusion 255 and the second protrusion 245. Thus, the locking protrusions 240 and 241 are maintained to be locked in the locking recesses 250 and 251, and the rear case 203 is not separated from the inner case 205.

Conversely, if a force of more than a certain value is applied in the opposite direction in the sate of FIG. 12C, the second protrusion 245 reversely passes over the first protrusion 255. When the second protrusion 245 passes through the peak of the first protrusion 255, the rear case 203 is continuously moved in the direction in which it has been moved owing to the elastic restorative operation of the rear case 203 and the configuration of the first protrusion 255 and the second protrusion 245 (FIGS. 12B and 12A). While the rear case 203 is horizontally moved, the rear case 203 becomes away also in a vertical direction due to the operations of the slope guide faces 252 and 253 of the locking recesses 250 and 251 and the slope faces 242 and 243 of the locking protrusions 240 and 241. Also, the movement of the rear case 203 in the vertical direction means that the inner wall of the camera hole 246 is freely released without being caught by the camera mounting part 230.

Figure 13A:
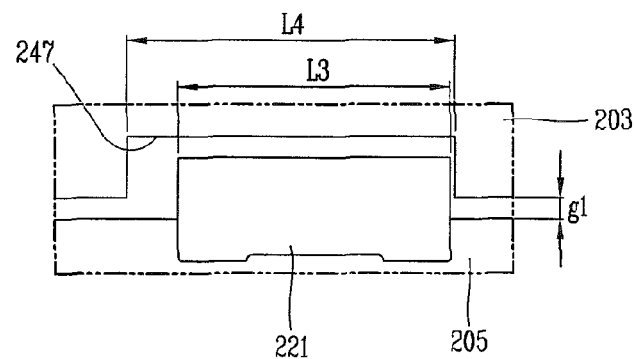
FIGS. 13A and 13B illustrate operational states showing the relationship between an interface unit installation hole formed at the rear case and an interface unit when the case is locked and when the case is unlocked.
Figure 13B:
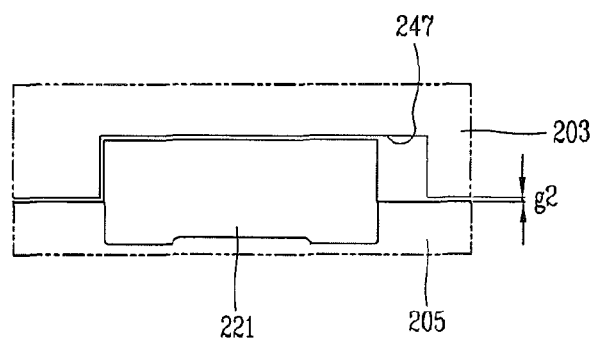

FIGS. 13A and 13B illustrate operational states showing the relationship between the interface unit installation hole 247 formed at the rear case 203 and the interface unit 221 when the case is locked and when the case is unlocked.

As shown in FIGS. 13A and 13B, the interface unit installation hole 247 is formed at the side of the rear case 203. In order to prevent the interface unit installation hole 247 from being limited by the interface unit 221 due to the horizontal movement made when the rear case 203 is locked or unlocked, the length L4 of the interface unit installation hole 247 is larger than the sum L3 of the distance along which the locking protrusion is horizontally moved and the length of the interface unit between when the rear case 203 is locked or when the rear case 203 is unlocked.

Accordingly, as shown in FIG. 13A, before the rear case 203 is coupled to the inner case 205, the interface unit 221 is positioned at one side of the interface unit installation hole 247 in a state that there is a certain gap g1 in a horizontal direction between the rear case 203 and the inner case 205, but when the rear case 203 is coupled to the inner case 205, the rear case 203 and the inner case 205 are positioned to be almost in contact with each other with a gap g2 therebetween and the interface unit 221 is positioned at the opposite side of the interface unit installation hole 247.

With such configuration, the rear case 203 is slopingly moved to be coupled to the terminal body 201 or slopingly moved to be separated from the terminal body 201. In this process, the rear case 203 can be freely moved without being interfered with by any portions of the terminal body 201. In particular, because the camera hole 246 has the length corresponding to the camera mounting part 230, complicated assembling lines can be omitted or generation of a gap can be prevented.

As so far described, in the mobile terminal according to the exemplary embodiment of the present invention, while the rear case is coupled to or separated from the terminal body, it is slopingly moved with respect to the terminal body, so the camera hole of the rear case can be freely moved without being restricted by the camera mounting part protruded from the terminal body. Such disposition can prevent aesthetic degradation of an external appearance otherwise because the camera hole of the case is formed to be large.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a terminal body;
a camera mount installed in the terminal body and configured to protrude from a rear surface of the terminal body;
a camera mounted in the camera mount;
a case detachably coupled to the rear surface of the terminal body such that the case has a locked configuration and an unlocked configuration, the case comprising a camera hole configured to expose the camera mount such that the camera protrudes from the camera hole when the case is in the locked configuration, the case sliding in a vertical direction at a first angle with respect to the terminal body when the case is moved between the locked configuration and the unlocked configuration such that the camera hole moves without being restricted by the camera mount; and
a locking unit comprising:
a plurality of locking recesses formed on the rear surface of the terminal body, each of the plurality of locking recesses having a slope guiding portion in a same direction;
locking protrusions formed on an inner surface of the case, each of the locking protrusions corresponding to one of the plurality of locking recesses and having at least one slope face that is brought into contact with the slope guiding portion of the corresponding locking recess; and
horizontal locking units configured to interrupt retreat of the locking protrusions when each of the locking protrusions slopingly enters the slope guiding portion of the corresponding locking recess, each of the horizontal locking units comprising a first protrusion formed on the terminal body and a second protrusion formed on the inner surface of the case, the second protrusion configured to move in contact with the first protrusion.

2. The mobile terminal of claim 1, wherein the locking unit detachably couples the case to the rear surface of the terminal body.

3. The mobile terminal of claim 2, wherein each of the plurality of locking recesses comprises:
   a plurality of first locking recesses formed along edges of the rear surface of the terminal body; and
   at least one locking recess formed on one portion of the camera mount.

4. The mobile terminal of claim 2, wherein the camera mount protrudes from the camera hole when the each of the locking protrusions completely enters the corresponding locking recess.

5. The mobile terminal of claim 2, wherein the slope guiding portion of each of the plurality of locking recesses comprises:
   a first sloped guide face with which the at least one slope face of the corresponding locking protrusion is brought into contact when the case is in the locked configuration; and
   a second sloped guide face configured to retreat the corresponding locking protrusion when the case is in the unlocked configuration.

6. The mobile terminal of claim 5, wherein the at least one slope face of each of the locking protrusions comprises:
   a first sloped face configured to allow the first sloped guide face to be brought into contact with the first sloped face when the case is in the locked configuration; and
   a second sloped face configured to allow the second sloped guide face to be brought into contact with the second sloped face when the case is in the unlocked configuration.

7. The mobile terminal of claim 2, wherein a slope face of the slope guiding portion of each of the plurality of the locking recesses has a second angle and a length such that at least one inner wall of the camera hole avoids contact with the camera mount when the case is moved into the locked configuration or the unlocked configuration.

8. The mobile terminal of claim 7, wherein edge portions of at least the camera mount or camera hole are chamfered or rounded.

9. The mobile terminal of claim 7, further comprising an interface unit, wherein:
   the case comprises an interface unit installation hole configured to receive the interface unit; and
   a length of the interface unit installation hole is greater than a sum of a length of the interface unit and a distance along which each of the locking protrusions is horizontally moved when the case is moved into the locked configuration or the unlocked configuration.

10. The mobile terminal of claim 2, wherein:
    the case covers the rear surface of the terminal body and a side surface of the terminal body; and
    the locking protrusions are located at a side portion of the case.

11. The mobile terminal of claim 2, wherein the camera mount has a length corresponding to a length of the camera hole.

12. The mobile terminal of claim 2, further comprising a recessed portion located on the inner surface of the case and at one side of the camera hole, the recessed portion having a depth such that the case does not contact the camera mount when the case is moved between the locked configuration and the unlocked configuration.

13. The mobile terminal of claim 1, wherein the rear surface of the terminal body is exposed when the case is in the unlocked configuration.

14. The mobile terminal of claim 1, wherein components mounted on the rear surface of the terminal body can be replaced without providing a cover for each of the components.

* * * * *